US008118677B2

(12) United States Patent
Robb (10) Patent No.: US 8,118,677 B2
(45) Date of Patent: Feb. 21, 2012

(54) DEVICE IDENTIFICATION (75) Inventor: Harold K. Robb, Reno, NV (US)

(73) Assignee: Bally Gaming International, Inc., Las Vegas, NV (US)

(*) Notice: Subject to any disclaimer, the term of this patent is extended or adjusted under 35 U.S.C. 154(b) by 1040 days.

(21) Appl. No.: 11/319,034

(22) Filed: Dec. 23, 2005

(65) Prior Publication Data
US 2007/0055753 A1 Mar. 8, 2007

Related U.S. Application Data (63) Continuation-in-part of application No. 11/220,781, filed on Sep. 7, 2005.

(51) Int. Cl.
A63F 13/00 (2006.01)

(52) U.S. Cl. ........................................................ 463/42

(58) Field of Classification Search .............. 463/40–42, 463/16–20; 370/389, 400, 401
See application file for complete search history.

(56) References Cited

U.S. PATENT DOCUMENTS

| 5,429,361 | A | * | 7/1995 | Raven et al. | 463/25 |
|---|---|---|---|---|---|
| 6,055,236 | A | * | 4/2000 | Nessett et al. | 370/389 |
| 6,110,041 | A | * | 8/2000 | Walker et al. | 463/20 |
| 6,113,493 | A | * | 9/2000 | Walker et al. | 463/25 |
| 6,227,972 | B1 | * | 5/2001 | Walker et al. | 463/25 |
| 6,254,482 | B1 | * | 7/2001 | Walker et al. | 463/25 |
| 6,631,416 | B2 | | 10/2003 | Bendinelli et al. | |
| 6,682,423 | B2 | | 1/2004 | Brosnan et al. | |
| 6,772,348 | B1 | | 8/2004 | Ye | |
| 6,832,322 | B1 | | 12/2004 | Boden et al. | |
| 6,908,391 | B2 | | 6/2005 | Gatto et al. | |
| 6,916,247 | B2 | | 7/2005 | Gatto et al. | |
| 6,945,870 | B2 | | 9/2005 | Gatto et al. | |
| 2003/0100369 | A1 | | 5/2003 | Gatto et al. | |
| 2004/0054445 | A1 | | 3/2004 | Vollmer et al. | |
| 2004/0185936 | A1 | | 9/2004 | Block et al. | |
| 2004/0193726 | A1 | | 9/2004 | Gatto et al. | |
| 2004/0198496 | A1 | | 10/2004 | Gatto et al. | |
| 2005/0036441 | A1 | * | 2/2005 | Laroia et al. | 370/203 |
| 2005/0113172 | A1 | | 5/2005 | Gong | |
| 2005/0172336 | A1 | | 8/2005 | Gatto et al. | |

(Continued)

FOREIGN PATENT DOCUMENTS

WO WO02/095543 11/2002
WO WO 2004004855 A1 1/2004

OTHER PUBLICATIONS

Box et al. "Simple Object Access Protocol (SOAP) 1.1" [online], May 8, 2000 [Retrieved Feb. 5, 2007] www.w3.org/TR/2000/NOTE-SOAP-20000508.

(Continued)

Primary Examiner — David L Lewis
Assistant Examiner — Eric M Thomas
(74) Attorney, Agent, or Firm — Steptoe & Johnson LLP (57) ABSTRACT The system provides the capability of identifying the presence and location of network devices. During start-up, a device sends its MAC address out on the network. A local switch collects MAC and IP addresses for the devices connected to it. Periodically, the switch transmits raw Ethernet frames, USB packets, or TCP packets containing tables of devices and associated MAC/IP addresses. When a device receives information about another device, the device may attempt communication with that device. First, a verification procedure is used to validate the devices. Subsequently, communication is possible between the devices.

20 Claims, 7 Drawing Sheets

U.S. PATENT DOCUMENTS

2005/0209006 A1    9/2005   Gatto et al.
2005/0209007 A1    9/2005   Gatto et al.
2005/0221898 A1   10/2005   Gatto et al.
2005/0223219 A1   10/2005   Gatto et al.
2005/0233811 A1   10/2005   Gatto et al.
2005/0282637 A1   12/2005   Gatto et al.
2006/0100010 A1    5/2006   Gatto et al.

OTHER PUBLICATIONS

Gaming Standards Association. "S2S Message Protocol v 1.00" [online], Mar. 11, 2005 [Retrieved Feb. 5, 2007] http://web.archive.org/web/20050311052509/http://www.gamingstandards.com/standards.html.

* cited by examiner

DEVICE IDENTIFICATION

RELATED APPLICATION

This patent application is a continuation-in-part of pending U.S. patent application Ser. No. 11/220,781 filed on Sep. 7, 2005 entitled "Gaming Network" and assigned to the assignee of the present application.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The claimed invention relates generally to a network, and more particularly, to a gaming network with an identification and communication system for network devices.

2. Background

In early gaming environments, gaming machines were stand-alone devices. Security of the gaming machines was accomplished via physical locks, security protocols, security personnel, physical and video monitoring, and the need to be physically present at a machine to attempt to breach the security of the gaming machine. By the same token, management of the gaming machines required a great deal of personal physical interaction with each gaming machine. The ability to change parameters of the gaming machine also required physical interaction.

In view of the increased processing power and availability of computing devices, gaming machines have become customizable via electronic communications and remotely controllable. Manufacturers of gaming equipment have taken advantage of the increased functionality of gaming machines by adding additional devices and features to gaming machines, thereby maintaining a player's attention to the gaming machines for longer periods of time increasing minimum bet and bet frequency and speed of play. This, in turn, leads to the player wagering at the gaming machine for longer periods of time, with more money at a faster pace, thereby increasing owner profits.

One technique that has been employed to maintain a player's attention at the gaming machine has been to provide players with access to gambling-related information. In this regard, attaching a small electronic display to the gaming device, gambling-related information, as well as news and advertisements can be sent to the player. The gambling-related information may include, for example, information on sports betting and betting options for those sporting events. Additionally, the gambling-related information may also include information such as horse racing and off-track betting. News and advertisements can also maintain a player's attention by providing the player with access to information ranging from show times, to restaurant and hotel specials, and to world events, thus reducing the need and/or desire of the player to leave the gaming machine.

Moreover, it has been shown to be desirable to provide the player with interactive access to the above information. This type of interactivity allows players significantly more flexibility to make use of the above-described information. The gambling-related information can also be utilized by the player in a much more efficient manner. In this regard, greater levels of flexibility and access are likely to make the player remain and gamble at the gaming machine for significantly longer periods of time.

In addition, the player may participate in a "premium" promotion where the player is registered with the gaming establishment as a club member when the player inserts an ID card into the gaming machines during play. The player may be rewarded for certain play patterns (e.g. wager amounts, wager totals, payouts, time of play, or the like) and earn redeemable benefits or upgrade of club member status.

Attempts to distribute gambling-related information and advertisements to players and to allow the recognition of premium membership players have resulted in additional system components that may be attached to the gaming devices. These components for accessing and displaying information for gaming machines may include a keypad, card reader, and display equipment.

The amount of interactivity and data presentation/collection possible with current processor based gaming machines has led to a desire to connect gaming machines in a gaming network. In addition to the gaming machines themselves, a number of devices associated with a gaming machine or with a group of gaming machines may be part of the network. It has become important for the devices within a gaming machine or cabinet to be aware of each other and to be able to communicate to a control server. Not only is the presence or absence of a network device important, but also the physical location of the device and the ability to associate devices within a particular gaming machine has become a necessary component of a gaming network.

Current networks for gaming machines have been primarily one-way in communication, have been slow, and have been proprietary (custom designed and incompatible with commercial networking equipment). Prior art networks provided accounting, security, and player related data reporting from the gaming machine to a backend server. Secondary auditing procedures allowed regulators and managers to double check network reporting, providing a method of detecting malfeasance and network attacks. However, such security is remote in time from when a network attack has occurred. Prior art networks lack many security features needed for more rapid detection of cheating from a variety of possible attackers.

Although prior art networks of gaming machines provide advantages to gaming establishment operators, they also engender new risks to security of the gaming establishment and to the gaming machines. Not only is traditional data associated with gaming machines now potentially at risk on the gaming network, but personal player information is now at risk, as well.

In addition, the proprietary nature of prior art gaming machine networks limits the ability to use commercially available technology. This adds to the cost of gaming networks and limits their scalability and the ability to upgrade as technology improves. Further, as gaming machines are grouped in networks, the value of the pooled financial data traversing the network creates a great temptation to attack the network. The potential reward from attacking a network of gaming machines is greater than the reward from attacking a single machine.

Figure 7:
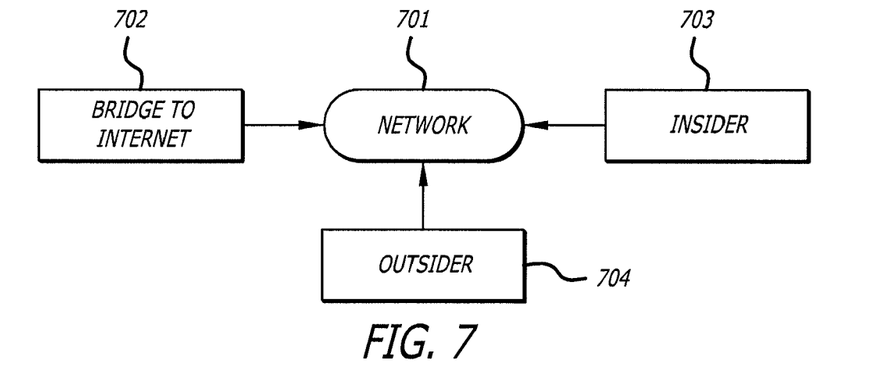
FIG. 7 is a block diagram illustrating examples of possible network attacks.

Attempts to illicitly obtain access to the gaming network are referred to as network attacks. These attacks can be driven by different motivations and are characterized by the type of attack involved. In addition, attackers can be either insiders (gaming establishment employees, regulators, security personnel) or outsiders. FIG. 7 illustrates possible attacks on a network. The gaming network 701 may be attacked by an insider 703. Insiders include casino employees, regulators, game manufacturers, game designers, network administrators, and the like. Outsiders 704 might also attack the network 701. Outsiders may include hackers with an IP connection attacking the network and/or devices (including games) on the network. The network may be attacked via a bridge 702 to the Internet. Examples of attacks are described below. In many cases, an attacker may attempt to populate the network with one or more devices that are not valid members of the network. The presence of such devices on the network may provide information to an attacker that can be used in attacks on the network. The devices might also themselves serve as a point of attack on the network. For example, an attacker could place a bill collector on the network that would allow the user to effectively play for free by providing false coin-in information. Other false devices could be added to the network, leading to security risks.

Attack Motivation

Typical motivations for attack on a gaming network include the desire to steal money or to embarrass or blackmail an entity. For example, an attacker may attempt to steal money from the gaming establishment, from a patron or player, or from a regulatory or other political body (e.g., a state that taxes gaming revenue). The attempt to steal may involve attempts to artificially manipulate wagers or payouts to the attacker's benefit. An attacker may also attempt to obtain credit or other personal information from the network that can be used to illicitly obtain money. Other attackers (typically insiders) may wish to manipulate accounting data to defraud government agencies by underreporting taxable revenue. An attacker may attempt to collect gaming habit or other sensitive information regarding a patron as a blackmail threat, or the attacker may attempt to embarrass or blackmail the gaming establishment, the gaming machine manufacturer, a regulating agency, or a political organization by showing the vulnerability of the network to attack. Instead of taking money directly, an attacker may attempt to manipulate a network so that a gaming establishment loses money to players.

Attack Types

Attackers may attempt one or more direct attacks against the network, attacks against hosts, physical attacks, or other types of attacks. Attacks against the network may include attempts to obtain plaintext network traffic, forging network traffic, attaching fraudulent devices to the network, and denying network services.

Consequently, there are a number of methods of attack to obtain plaintext traffic. An attacker may eavesdrop (e.g., electronically) on unprotected traffic. The plaintext messages may be openly accessed or inferred via message and traffic analysis. Eavesdropping may be accomplished by illicitly controlling a device that is a legitimate part of the network or by re-routing network traffic to the attacker's own device.

Furthermore, if the attacker has access to the network and can mimic network protocols, the attacker may forge network traffic so that malicious messages are routed as legitimate messages. Such malicious messages can affect game play, send false financial transactions, reconfigure network administration, and/or disable security features to permit other forms of attack, or to hide current attacks. This type of attack may also include repeating legitimate messages for malicious purposes, such as repeating a password message to gain access to the privileges associated with that password, playing back a cash withdrawal request, a winning game play message, or a jackpot won event.

Still further, "denial of service" attacks are a notorious method of attacking a network or server. Such attacks often consist of flooding the network with bogus messages, therefore blocking, delaying, or redirecting traffic. The saturation of the network at the devices, servers, IP ports, or the like, can prevent normal operation of the network, especially for those network services that are time sensitive.

Moreover, an attacker may also use the network to attack a host or to attack the host directly via a local console. This is accomplished by attacking vulnerable, exposed, and/or unprotected IP ports, or via a "worm" transmitted via email, for example. In this way, malicious code can be introduced into the network to open the door for later attacks and to mask this and other attacks.

In addition, physical attacks on the network devices may also be a goal of an attacker. The devices, hosts, servers, and consoles should all have physical protection and security to prevent access by outsiders or by unauthorized insiders. Devices requiring such protection may include game machines, network cables, routers, switches, game servers, accounting servers, and network security components including firewalls and intrusion detection systems.

Other attacks may include attacks on the encryption/certification system. An attacker may attempt to compromise or to obtain the private key (e.g. of an operator or a manufacturer) of a public key infrastructure. Alternatively, the attacker may compromise the certifying authority of the network owner. Other schemes may include reinstalling older, but legitimate versions of software (recognized by the system as legitimate) the older version not being updated for corrected security flaws. Bridging a secure network to another network may also be attempted.

In some cases, the regulatory jurisdiction may have its own encryption key. This may be another type of inside attack that may be made. Someone in the regulatory jurisdiction may attempt to move or spoof data on the network for one or more of the purposes described above.

A gaming network may have a large number of dynamically changing and reconfigurable components. Because of the desire to keep down-time to a minimum, it is important that the population of devices on the network be determinable and verifiable. In the past, this has meant pre-programming knowledge of all other devices into each device, so that communication between devices could take place. Such a requirement of pre-programming or pre-knowledge is too time consuming to be practical in a gaming network environment.

Accordingly, a gaming network requires robust protection against attacks from insiders and outsiders using a variety of attack methods.

SUMMARY OF THE INVENTION

Briefly, and in general terms, the gaming network described herein includes network security features, host security features, audit protocols, and design architecture approaches to reduce the possibility and success of network attacks. More particularly, the gaming network provides for traffic confidentiality, encryption, message authentication, secure authentication mechanisms, anti-replay protection of traffic, key management mechanisms, robust network availability, misrouting and redirection protection and prevention, rejection of external traffic, and a high entry barrier to device addition to the network.

The host protection and security aspects include secure host initialization, disabling unneeded components, download verification, disabling of unused IP ports, discarding traffic, strong passwords, dynamic one time passwords for remote login, disabling default accounts, and appropriate "least-level" device privileges.

Audit requirements include integrity protection of audit logs, appropriate definition of auditable events, auditing of anomalous behavior, chain of evidence preservation, shutdown if audit disabled, full log entry audits, personal ID and time access audit trails, and auditing of internal user actions.

In one embodiment of the gaming network, a host and a network device authenticate themselves to each other on the gaming network and generate a first security association. The host and the network device, which may be a gaming machine, use the first security association to generate a second security association for use in protecting message traffic on the gaming network. Each message has a certain minimum level of protection, provided by encryption in one embodiment, while still permitting additional security measures to be implemented in transactions between devices on the gaming network. In another embodiment, the negotiation used to authenticate a device to a host is the Internet Key Exchange (IKE) protocol phase I. In yet another embodiment, the protection of message traffic on the gaming network is accomplished by IKE protocol phase II.

In another embodiment, the gaming network comprises a core layer with a host server and switches, a distribution layer with managed routers and switches, and an access layer that includes managed switches and game machines. In another embodiment, the gaming network includes intrusion detectors to monitor attempts to attack the network. In yet another embodiment, the gaming network includes automatic disabling of any device where an intrusion attempt is detected by the intrusion detector. In another embodiment, logically grouped devices can be identified and associated with a particular gaming machine. In yet another embodiment, identification and communication of network devices is accomplished using the device network connection through an in-game switch device.

Similarly, in yet another embodiment, the gaming establishment system maps the association of legitimate IP addresses with device MAC addresses, unique device ID's (DID) and treats any alteration of any IP/MAC/DID association as an intrusion attempt. In still another embodiment, the gaming network uses private network IP addresses for network members. In another embodiment, the gaming network implements a virtual private network protocol.

The system provides the capability of identifying the presence and location of network devices. During start-up, a device sends its MAC address out on the network. A local switch collects MAC and IP addresses for the devices connected to it. Periodically, the switch transmits raw Ethernet frames, USB packets, or TCP packets containing tables of devices and associated MAC/IP addresses. When a device receives information about another device, the device may attempt communication with that device. First, a verification procedure is used to validate the devices. Subsequently, communication is possible between the devices. The system in one embodiment uses the steps of MAC transmission/table building/rebroadcast, device identification, verification, and communication to enable network devices to find and communicate with each other.

These and other features and advantages of the claimed invention will become apparent from the following detailed description when taken in conjunction with the accompanying drawings, which illustrate, by way of example, the features of the claimed invention.

DETAILED DESCRIPTION

The claimed invention is directed to a gaming network. The preferred embodiments of the system and method are illustrated and described herein, by way of example only, and not by way of limitation.

The gaming network described herein proposes an architecture and system that provides an appropriate level of security from network attack. There exist techniques to authenticate and verify individual messages or activities in existing gaming establishment networks relying on proprietary protocols, transport and message formats. However, the gaming network described herein provides additional protection to the network itself particularly when use of commercially based IP equipment is envisioned, above and beyond particular security protocols, for activities and transactions carried on the network. The gaming network is independent of, and in addition to, security techniques for particular transactions or activities.

Figure 1:
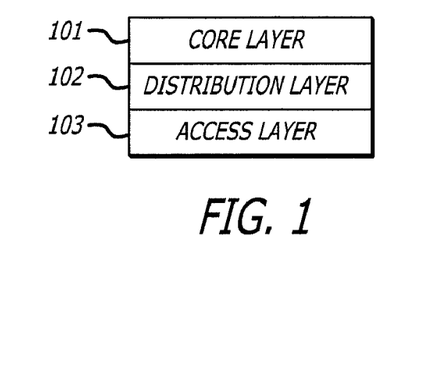
FIG. 1 is a diagram of an embodiment of functional layers of a gaming network.

Referring now to the drawings, wherein like reference numerals denote like or corresponding parts throughout the drawings and, more particularly to FIGS. 1-7, there is shown one embodiment of the gaming network constructed in accordance with the claimed invention. As shown in FIG. 1, the network includes a core layer 101 over a distribution layer 102 above an access layer 103. The core layer 101 serves as a gateway between servers and the gaming devices. The core layer 101 is contemplated to be a so-called "back end" layer that resides in an administrative location, separate from the gaming floor, for example, and protected physically and electronically.

The distribution layer 102 serves to collect traffic between the core layer 101 and the access layer 103. The distribution layer may comprise trunks and switches that route message and signal traffic through the network. The access layer 103 provides a physical interface between the gaming machines (and any of their associated devices) and the rest of the network. This is done via managed switches.

Figure 2:
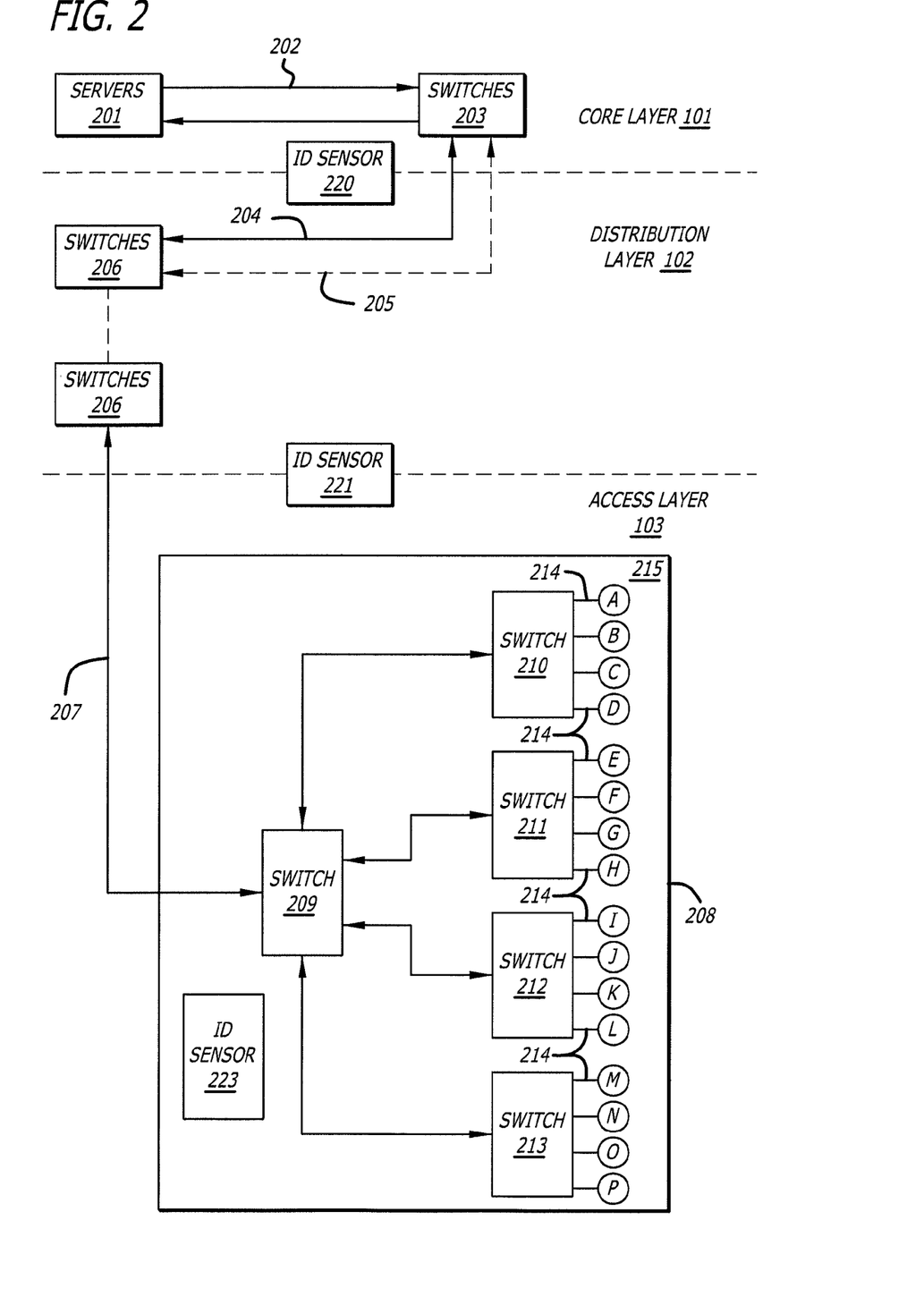
FIG. 2 is a block diagram of an embodiment of a gaming network.

One embodiment of a network using the layered scheme of FIG. 1 is illustrated in FIG. 2. The core layer 101 includes one or more servers 201 that are coupled via a communication path 202 to one or more switches 203. In one embodiment, the servers and switches of the core layer 101 are located within the gaming establishment premises in a secure administrative area. The servers 201 may, but are not required to be, game servers. The communication path 202 may be hardwire (e.g., copper), fiber, wireless, microwave, Ethernet, wireless Ethernet, or any other suitable communication path that may be protected from attack. In one embodiment, the switches 203 are L2/L3 switches. However, one of ordinary skill in the art will appreciate that other types of switches may be used without departing from the scope or spirit of the claimed invention.

The distribution layer 102 communicates with the core layer 101 via high bandwidth communications links 204. These links may be copper, fiber, Ethernet, wireless Ethernet, or any other suitable link. If desired, redundant links 205 may be built into the system to provide more failsafe operation. The communications links couple the core layer switches 203 to the distribution layer switches 206. These may be one or more switches, such as L2 switches, for example.

The distribution layer 102 communicates with the access layer 103 via a high capacity communication link 207. The link 207 may be Ethernet, wireless Ethernet, wire, fiber, wireless, or any other suitable communication link. In the embodiment of FIG. 2, the communication link 207 is coupled to a gaming carousel 208 that comprises a plurality of gaming machines (e.g., 16 gaming machines 215A-215P). A managed switch 209 is coupled to the link 207 to provide an interface switch to a plurality of other managed switches 210 through 213. In the embodiment illustrated, each of the managed switches 210-213 manages four game machines 215. It is understood that the types of switches may be changed without departing from the scope of the claimed invention. Further, switches with more or fewer ports may be substituted and more or fewer tiers of switches in the access layer may be used, as well, without departing from the scope or spirit of the claimed invention. In another embodiment, each game machine has its own managed switch.

In one embodiment of the gaming network, the network uses TCP/IP sessions between the gaming machines 215 and the servers 201. The TCP/IP sessions are used to exchange private information concerning game operations, game performance, network management, patron information, revised game code, accounting information, configuration and download, and other sensitive information. In one embodiment, sessions may be a single message and acknowledgement, or the sessions may be an extended interactive, multiple transaction session. Other instantiations may include UDP/IP, token ring, MQ, and the like.

In one embodiment of the gaming network, intrusion detectors provide additional security. In this regard, there may be intrusion detectors located between each layer, such as intrusion detector 220 located between the core layer 101 and the distribution layer 102, and the intrusion detector 221 located between the distribution layer 102 and the access layer 103. In addition, certain sensitive locations or choke points may include intrusion detectors such as the intrusion detector 223 coupled to the switch 209. The intrusion detector 223 may disable the individual ports of switch 209 to isolate attacks while permitting continued operation of the remainder of the gaming network.

Figure 8:
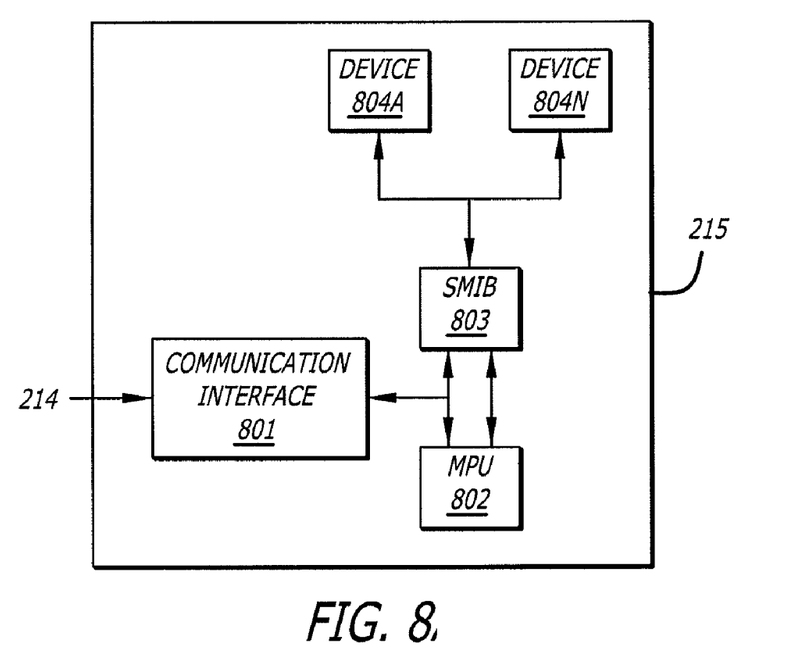
FIG. 8 is a block diagram of a gaming machine configuration in an embodiment of the invention.

FIG. 8 is a block diagram of an example gaming machine configuration in an embodiment of the invention. The gaming machine 215 communicates with the network (e.g. through a managed switch such as switch 210) via communications path 214 which may be Ethernet, wireless Ethernet, wire, fiber, wireless, or any other suitable communication link. The gaming machine 215 may include a communications interface 801 that handles communication between the gaming machine and its associated devices and the remainder of the gaming network. Communication interface 801 is coupled to a game monitoring unit (GMU) 802. The GMU serves as the processor of the gaming machine. An interface referred to as a "SMIB" 803 (smart interface board or slot machine interface board) is coupled to the GMU and to the communication interface 801. SMIB 803 is coupled to one or more peripherals or other devices connected to the gaming machine 215, such as devices 804A to 804N of FIG. 8. In one embodiment of the invention, SMIB 803 uses an Ethernet or other high-speed communications link to the communication interface 801, GMU 802, and devices 804A through 804N. In one embodiment, the SMIB includes switching capabilities. In one embodiment, the SMIB is implemented with a Mastercom 300.

The gaming network may use a number of network services for administration and operation. Dynamic Host Configuration Protocol (DHCP) allows central management and assignment of IP addresses within the gaming network. The dynamic assignment of IP addresses is used in one embodiment instead of statically assigned IP addresses for each network component. A DNS (domain name service) is used to translate between the domain names and the IP addresses of network components and services. DNS servers are well known in the art and are used to resolve the domain names to IP addresses on the Internet.

Similarly, Network Time Protocol (NTP) is used to synchronize time references within the network components for security and audit activities. It is important to have a consistent and synchronized clock so that the order and the timing of transactions within the gaming network can be known with reliability and certainty. Network information can be gathered centrally at a single workstation by using the Remote Monitoring (RMON) protocol. SNMP (simple network management protocol) allows network management components to remotely manage hosts on the network, thus providing scalability. In one embodiment of the gaming network, SNMPv3 is used to take advantage of embedded security mechanisms to mitigate malicious attacks made against the configuration management function. Still further, TFTP (trivial file transfer protocol) is used by servers to boot or download code to network components.

In one embodiment, the network may be implemented using the IPv6 protocol designed by the IETF (Internet Engineering Task Force). When using IPv6, the network may take advantage of the Quality of Service (QoS) features available with IPv6. QoS refers to the ability of a network to provide a guaranteed level of service (i.e. transmission rate, loss rate, minimum bandwidth, packet delay, etc). QoS may be used as an additional security feature in that certain transactions may request a certain QoS as a rule or pursuant to some schedule. Any fraudulent traffic of that nature that does not request the appropriate QoS is considered an attack and appropriate quarantine and counter measures are taken.

Similarly, the Type of Service (ToS) capabilities of IPv4 may also be used in a similar manner to provide additional security cues for validation of transactions. Again, certain types of transactions may be associated with a particular specific ToS or a rotating schedule of ToS that is known by network monitors.

Traffic Content

In an embodiment of the gaming network, the traffic content varies in size and sensitivity. Messages may comprise transactional messages related to game play, such as coin-in. Other messages may be related to management, administration, or sensitive information, such as administrator passwords, new game code, pay tables, win rates, patron personal data, or the like.

Security

The gaming network includes network security features, host security features, audit protocols, and design architecture approaches to reduce the likelihood of success of network attacks. Where attacks cannot be prevented, the gaming network attempts to make such attacks expensive in terms of the computational power required, the time, risk, effect, and duration of the attack. Identification of attacks and the rapid recovery from such attacks should be emphasized, as should the limiting of the effect of any attacks.

Accordingly, the gaming network provides for traffic confidentiality. All nodes within the network exchange information that is confidentially protected. One method for providing confidentially protected data is by using encryption. A number of encryption schemes may be used, such as an FIPS approved encryption algorithm and an NIST specified encryption mode, such as the Advanced Encryption Standard (AES).

In addition, all nodes within the gaming network apply source authentication and integrity of all traffic. A suitable message authentication mechanism may be, for example, an FIPS approved algorithm such as the Keyed-Hash Message Authentication Code (HMAC) and SHA-1. All nodes automatically drop messages that have been replayed. As noted above, replayed messages are a means of attack on network security.

Key management mechanisms should be sufficient to resist attack. In one embodiment, a 1024 bit Diffie-Hellman key exchange with a 1024 bit DSA/RSA digital signature is used to render key attacks computationally infeasible. It should be noted that the key sizes are given as examples only. Smaller or greater key size can be used in the gaming network as security recommends. The gaming network should be robust, maintaining the availability of critical services. The network should include protection against misrouting and also discard any traffic that has a source or destination outside of the network. The gaming network should also require a minimum level of authentication and assurance before permitting an additional device on the network and prevent such connection when the assurance is not provided.

Host protection and security includes secure host initialization where the host performs a self-integrity check upon power-up initialization. All operating system components that are not needed are disabled. When software patches are downloaded to the gaming network, the host verifies them. The host checks for unused IP ports and disables them prior to connecting to the gaming establishment network. When processing network traffic, any traffic not addressed to the host is dropped from the processing stack as soon as possible. In the gaming network, all service, guest, and default administrator accounts that may be part of the operating system are disabled. In one embodiment, one-time passwords and/or multi-part passwords are used for remote login, if remote login is enabled. The one-time password may itself be a multi-part password. When using a multi-part password, different trusted individuals each hold a part of the multi-part password. The entire password is required for enablement of the system. This prevents any single individual from compromising security. Moreover, all host software components are operated with the lowest privilege necessary for sufficient operation. For example, software that can operate with "user" privilege will do so, to limit its usefulness to an attacker.

Audit requirements include integrity protection of audit logs from date of creation and throughout their use. Events that are audited in an embodiment of the gaming network include account logon events (both success and failure), account management (both success and failure), directory service events (failure), logon events (success and failure), object access (failure), policy changes (success and failure), privilege use (failure), system events (success and failure), access to a host or networking device logged by user name and the time of access, and all other internal user actions. Anomalous behavior is audited and logged for purposes of evidence for law enforcement and/or attack recognition. Audit information is collected and stored in a secure manner to preserve the chain of evidence. If there is a failure of the audit system, automatic shutdown is initiated.

The gaming network is designed so that there is no single point of failure that would prevent remaining security features from operating when one is compromised. The gaming network also will continue to operate in the event of bridging to another network, such as the Internet.

Secure Initialization of Network Devices

Figure 3:
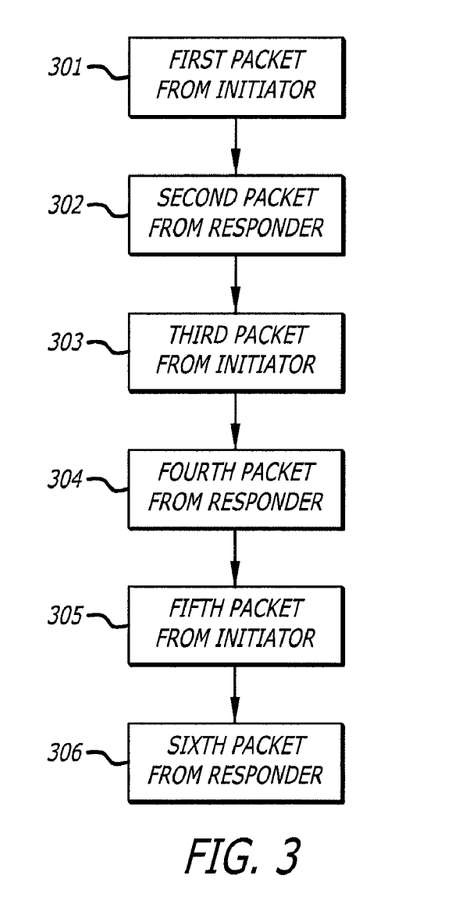
FIG. 3 is a flow diagram of initialization of a network device in an embodiment of a gaming network.

The gaming network provides confidence that a network device is contacting a legitimate DHCP server rather than a spoofed server. The gaming network uses Internet Key Exchange (IKE) in one embodiment. There are a number of modes and phases of IKE. Phase I of IKE includes two modes, referred to as "main mode" and an "aggressive mode". Phase II has a single mode referred to as "quick mode". Main mode takes six packets to complete while aggressive mode takes 3 packets. Quick mode takes 3 packets to complete. In some embodiments, Phase I is used for initialization and Phase II is used to create security for subsequent traffic and messages. FIG. 3 is a flow diagram illustrating the initialization of a network device using main mode of Phase I.

Phase I is used to authenticate devices to each other and to protect subsequent Phase II negotiations. In the following description, the network device is referred to as the initiator and the server is referred to as the responder. Referring to FIG. 3, at step 301, the initiator sends a first IKE packet to the responder. The packet may or may not include vendor ID's (VID) that can inform the responder of the extensions the initiator supports. Each IKE message includes a mandatory Security Association (SA) that defines how to handle the traffic between the two devices. The SA of the initial packet lists the security properties that the initiator supports, including ciphers, hash algorithms, key lengths, life times and other information. At step 302, the responder replies with an IKE packet that may or may not include a VID, but does include a mandatory SA payload. At this stage, the packets are not encrypted because there is still no key for encryption.

The third packet, at step 303, is from the initiator to the responder and uses the Diffie-Hellman key exchange protocol. The packet contains a key exchange (KE) payload, a NONCE payload, and a certificate request (CR) payload. The public keys are created whenever the phase I negotiation is performed and are destroyed when the phase I SA is destroyed. The NONCE payload is a large random number that has not been used before on the network ("never-used-before") and is useful in defeating replays. The CR payload includes the name of the Certification Authority for which it would like to receive the responder's certificate. (Note that the CR can be sent in the third and fourth packets or in first and second packets, as desired).

At step 304, the responder returns its own KE, NONCE, and CR in the fourth packet. The third and fourth packets are used by each device to generate a shared secret using public key algorithms. Because only public keys are sent in this exchange, and no encryption key is yet available, the messages are still not encrypted.

At step 305, the initiator uses the KE to generate a shared secret and uses it to encrypt the fifth message. The fifth message includes an Identification (ID) payload, zero or more certificate (CERT) payloads (or CRL) and a Signature payload (SIG) that is the digital signature that the responder must verify. The ID payload is used to tell the other party who the sender is and may include an IP address, FQDN (fully qualified domain name), email address, or the like. In an embodiment of the gaming network, it is an IP address. The CERT payload is optional if the initiator or responder cache the public key locally. In an embodiment of the gaming network, the public key is not cached locally and failure to receive a CERT payload is a failure of the negotiation. The SIG payload includes the digital signature computed with the private key of the corresponding public key (sent inside the CERT payload) and provides authentication to the other party.

At step 306, the responder sends a message with its ID, CERT, and SIG payloads. When both the initiator and responder have successfully verified the other party's SIG payload, they are mutually authenticated. The result of the successful negotiation is the Phase I SA.

Figure 4:
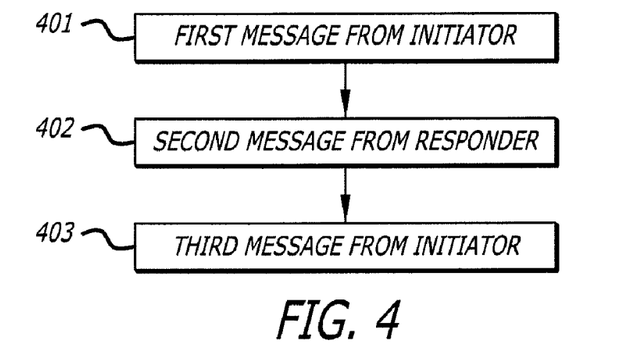
FIG. 4 is a flow diagram of traffic authentication in an embodiment of a gaming network.

After the phase I negotiation is successfully completed, the phase II negotiation can proceed to create SA's to protect the actual IP traffic with an IPsec protocol. Each of the phase II packets are protected with the phase I SA by encrypting each phase II packet with the key material derived from phase I. Phase II in the gaming network is illustrated in FIG. 4. At step 401, the initiator sends a message with a number of payloads. The message includes SA and NONCE payloads that are the keying material used to create the new key pair. As noted above, the NONCE payload includes random never-used-before data. The SA payload is the phase II proposal list that includes the ciphers, HMACs, hash algorithms, life times, key lengths, IPsec encapsulation mode, and other security properties. Optionally, the message may include IDi (initiators ID) and IDr (responders ID), which can be used to make local policy decisions.

At step 402, the responder replies with a message with the same payload structure as the first message. The initiator replies with a HASH value at step 403. After phase II is completed, the result is two SA's. One is used for inbound traffic and the other for outbound traffic.

Rekeying is done when the lifetime of the SA used for protecting network traffic expires. In one embodiment, PFS (perfect forward secrecy) protocol is used for rekeying. The network ensures the set of secret keys generated by one protocol message exchange is independent of the key sets generated by the other protocol message exchanges. This means compromise of one key set does not lead to compromise of the other sets Additional protection for network traffic is provided by use of a "virtual private network" (VPN). As a result, all network traffic is protected, and not just TCP/IP traffic.

In an alternate embodiment, the network may be constrained to a particular regulatory jurisdiction. In this embodiment, a regulatory jurisdiction has its own private key and a multi-tiered approach is used to validate devices. During initialization, a combination key at an administrative location is used to sign messages and data. If there are attempts to communicate outside the jurisdiction, the lack of the regulatory jurisdiction key prevents communication. This is another security feature that is used to limit inside and outside attacks on the gaming network.

In one embodiment, the system uses a secure key server to store private keys and certificates. The secure key server requires multi-part passwords as described above for access and enablement. The secure key server is resistant to network or Internet attacks, denial of service attacks, and other software or protocol attacks. The secure key server is also resistant to physical attacks such as forced break-in attempts, changes in temperature, changes in pressure, vibration, attempts to disassemble the secure key server. In one embodiment, any attack attempt results in the destruction of stored keys, certificates, etc, to prevent compromise of the system.

In another embodiment, a physical transfer of certificates may be implemented as an additional security protection. No game machine or other device may be added to the system without a physical visit and installation of a certificate. In other words, a mere handshaking protocol is not sufficient to add a device onto the system. Rather, a potential new device will require a trusted person or persons to activate the device, install an appropriate certificate, and add it to the network.

Blocking Illegitimate Traffic

As described above, the gaming network uses IKE, IPsec, and VPN to protect legitimate traffic from mischief. The gaming network also provides systems to block illegitimate traffic. Firewalls are installed at choke points within the access and distribution layers to isolate network segments from one another. Firewalls can limit the spread of damage from propagating beyond the compromised network segment. The use of NONCE never-used-before random numbers also prevents illegitimate traffic by blocking replay of legitimate messages. IKE and protection of all post initialization traffic makes it more difficult for illicit messages to achieve successful delivery.

In addition to detecting false messages using the techniques above, the gaming network reduces the possibility of access to the network by blocking all unused IP ports. Only IP ports required for gaming operation are enabled. To further limit the ability of outside access to the gaming network, private IP addresses are used. Typically IP addresses provide global uniqueness with the intention of participating in the global Internet. However, certain blocks of addresses have been set aside for use in private networks. These blocks of IP addresses are available to anyone without coordination with IANA or an Internet registry. Since multiple private networks may be using the same block of IP addresses, they lack global uniqueness and are thus not suitable for connection on the global Internet. Private network hosts can communicate with all other hosts inside the private network, both public and private. However, they cannot have IP connectivity to any host outside of the enterprise. Allocation of private network IP addresses may be accomplished pursuant to RFC 1918 protocol.

In another embodiment, the volume of network traffic is monitored at each link and compared to expected flow rates and/or historical flow rates. Histograms may be generated so that analysis and comparison of flow rates may be accomplished. Heuristic algorithms may be implemented to determine if the flow rate is within an acceptable range. If not, a data leak or attack is assumed and appropriate alarms are triggered. Heavy flow areas can be disabled so that appropriate investigation can be made.

Detecting and Reacting to Attacks

Intrusion detection system (IDS) sensors and/or intrusion prevention systems are installed between the core, distribution, and access layers. IDS and intrusion prevention sensors may also be installed at choke points within the access and distribution layers to detect malicious traffic within these layers. One suitable IDS is "arpwatch" (www.securityfocus.com/tools/142) that monitors IP address changes, MAC addresses, flow rate changes, and other network activity and can be configured to notify an administrator when IP/MAC/DID address bindings (e.g. the combination of game machine DID and/or one or more associated device DIDs) change for a device on a gaming network. When a change is detected, automatic isolation procedures may be implemented to isolate the possible intrusion. Subsequent analysis and review by network administrators can determine appropriate responses.

The system may keep a physical map of the location of the IDS sensors so that when an intrusion is detected, the physical location of the attack can be immediately identified. Security can be dispatched to the location to apprehend the attackers, appropriate systems may be shut down or disabled, and perimeter measures can be taken to increase the chances of securing the attacker.

Figure 5:
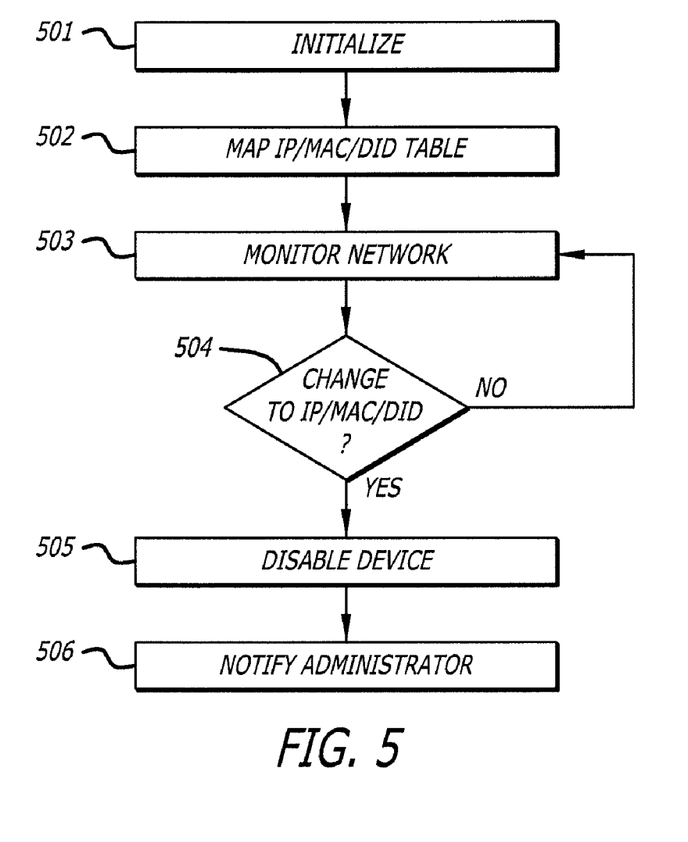
FIG. 5 is a flow diagram of an attack detection protocol in an embodiment of a gaming network.

FIG. 5 is a flow diagram of one embodiment of the operation of the intrusion detection system of the gaming network. At step 501, the gaming network is initialized and IP addresses are assigned to network devices. This may be accomplished using the technique described in FIGS. 3 and 4 or by any other suitable technique. At step 502, a mapping of the IP addresses of the network devices, their respective MAC addresses, and the DID is performed. This binding should remain stable through a session unless the core layer specifically initiates a change or if a regularly scheduled or anticipated change occurs.

At step 503, the system monitors the network. Such monitoring may be accomplished by any suitable means for tracking IP/MAC/DID mapping. As noted above, one such method includes Arpwatch. At decision block 504, it is determined if there has been any change to the IP/MAC/DID mapping. If the answer is no, the system continues monitoring the network at step 503. If the answer is yes, meaning that there has been some change in IP/MAC/DID mapping, the system disables the IP address and the network device associated with the MAC address and DID in question at step 505. This step of disabling may also include shutting down ports or sections of the network to contain or limit any presumed attack on the network. The system notifies the administrator at step 506 so that analysis and correction may begin.

In an alternate embodiment of the system, the mapping may be between any two of the parameters IP address, MAC, and DID. In addition, there may be multiple devices inside of the gaming machine. In some instances, the DID of the gaming machine may be used exclusively. In other instances, the DID of an associated device such as a reel controller, LED controller, CPU, safeRAM, hard drive, physical cabinet, printer, or other associated devices may be used singly or in combination with the gaming machine DID. Each associated device may have a unique ID (such as a 32 bit hex value) so that the combination of game machine DID and/or one or more associated device DID's results in a unique ID that is difficult to duplicate. Fraudulent communications that lack the requisite binding will be detected easily. Further, malicious hardware that attempts to join the network will lack not only the correct device ID's but also the combination bindings described above.

In yet another embodiment, the DHCP server is pre-loaded with a list of valid IP addresses, MAC addresses, machine and associated device DIDs, and IP/MAC/DID bindings. If the game machine requesting initialization or permission to join the network is not on the pre-determined list, the machine is not permitted on the network and an attack is logged. An alarm can be triggered so that the attacker can be identified and captured when possible.

In some instances, it may be useful to use dynamically assigned IP addresses in a gaming network. In such a situation, it is still important to be able to identify with certainty that only valid devices are on the network. In one embodiment, globally unique identifiers (GUIDs) are used to identify managed switches at one or more levels of hierarchy. For example, the switch could be at the game cabinet level, a bank of machine level, and/or a casino level. The GUID is used to positively identify a valid managed switch.

Associated with each managed switch is what is referred to herein as a "collection" of devices associated with that switch. The DIDs and MAC addresses can be used to identify the devices as being valid members of the collection. The dynamically assigned IP address can then be mapped to the collection so that the members of the network are known, and communication with the collection and its constituent devices can occur. The IP addresses can be subnet IP addresses for members of the collection if desired.

GUIDs are registered at network creation and when valid devices are added to the system. Once registered, dynamically assigned IP addresses can be properly mapped for communication using the IP address if desired.

In another embodiment, each network device has its own GUID that is registered and may be mapped to a dynamically assigned IP address. If desired, the bindings described above may be implemented even with dynamically assigned IP addresses, once the proper mapping has been made using GUIDs.

Another embodiment takes advantage of GUIDs to create logical collections instead of physical collections. A logical collection may be disparate physically but may be useful for certain management, reporting, or game play operations.

By being able to uniquely identify devices and collections, it is possible to create filters that allow communication with subsets of network devices at levels from single devices to collections to all devices and anywhere in between.

An additional security feature of the gaming network requires a secure boot sequence within each gaming machine and server such that an initial boot is accomplished using code residing in unalterable media. The initial boot code verifies the operating system and all network services it includes. Consequently, network services will not be enabled until the full operating system has been verified as legitimate.

Figure 6:
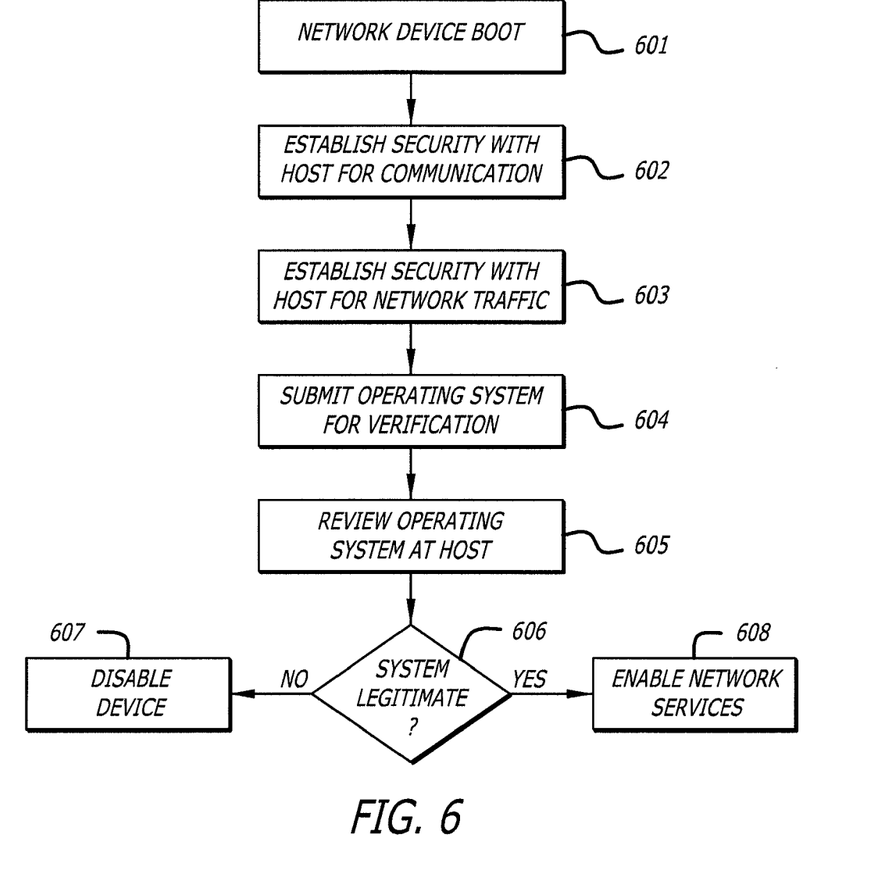
FIG. 6 is a flow diagram illustrating a network device initialization sequence in an embodiment of the gaming network.

FIG. 6 is a flow diagram illustrating the boot initialization of a network device, such as a gaming machine in one embodiment of the gaming network. At step 601, the device boots from a locally stored unalterable media. At step 602, the network device establishes security for communication with a network host. This may be accomplished by the IKE phase I method described in FIG. 3. Once secure host communication is established, traffic security is established at step 603. This may be accomplished by IKE phase II, as described in FIG. 4.

If any of the steps fail in this sequence, communication is terminated and a network administrator is notified. At step 604, the network device submits its operating system for verification. Such verification may be by any desirable method and may be in addition to other network security features. At step 605, the host receives the verification request and checks the operating system of the network device.

At decision block 606, it is determined if the network device contains a legitimate operating system. If not, the device is disabled at step 607. This process may initiate notice to a network administrator, as well as, disabling of some portion of the network associated with the device in an attempt to mitigate damage from an attack. If the operating system of the network device is legitimate at step 606, the host enables the appropriate network services for the network device at step 608 and operation begins. As noted above, all traffic is protected in the gaming network to some degree. In addition, some traffic includes additional security checks.

In one embodiment, the game machine provides a secure boot and initial O/S verification as follows. EPROM verification software resides within an input/output processor (IOP). The verification software verifies all EPROMs on the IOP board (i.e., mains and personalities) upon application of power to the game machine. Next, after the application of power to the machine, the BIOS+ performs a self-verification on all of its code. Once satisfactorily completed, the board (e.g. a Pentium class board) begins executing code from the BIOS+ contained in the conventional ROM device. This process verifies the conventional ROM device and detects any substitution of the BIOS+.

Upon boot-up of the processor, the BIOS+ executes a SHA-1 verification of the entire O/S that is presented. The digital signature is calculated and compared with an encrypted signature stored in a secure location on the game machine using, for example, the RSA private/public key methodology. If the signatures compare, the BIOS+ allows the operating system to boot, followed by the game presentation software. Next, display programs and content are verified, before being loaded into the IOP RAM to be executed for normal game operation.

During communication, each message is protected using the security of the gaming network. However, certain messages incorporate additional security checks even if the package is considered trustworthy. For example, code downloads may require that they be cryptographically signed and verified before executing. For messages such as these, the digital signature for the code is independent of and in addition to the authentication provided by VPN and the other network security features. In addition to the digital signature check and verification, the gaming network implements increasing number versioning of network downloaded updates so that rollback attempts may be mitigated or eliminated.

It may be desired to have some network communication links be wireless instead of hard wired. In such an environment, the gaming network includes wireless intrusion detection mechanisms detecting, for example, 802.1.1a/b/g devices. Such detection has scope beyond network attacks and may detect wireless attacks on the gaming establishment, even if not specifically targeting the gaming network.

Initialization of Gaming Machine Devices

An embodiment of the invention provides a process for identifying devices coupled to a game machine. This process is described in FIG. 9. At step 901, during initialization, each device (e.g. devices 804A-804N) attempts to communicate with the network and transmits its MAC/IP address. The address is received by a switch in the game machine (e.g. the SMIB 802) and a table of addresses of associated devices is assembled. This table is made available to the devices in the game machine so that the IP addresses of other devices within the gaming machine become available to each device.

Figure 9:
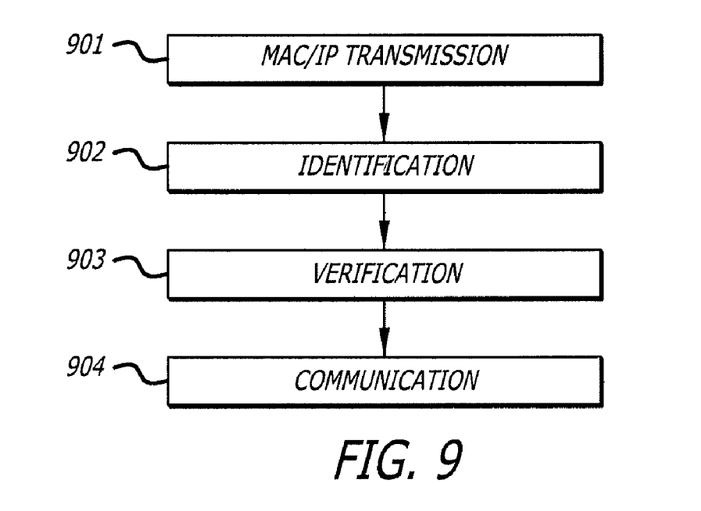
FIG. 9 is a flow diagram illustrating one embodiment of game machine device management using the invention.

At the identification step 902 each device identifies itself to other devices in the gaming machine. At step 903 a verification process is initiated so that it can be determined if the devices are valid devices on the network. At step 904 devices may begin to transmit data between themselves and to the core layer or other back-end server of the network.

MAC/IP Transmission

Figure 10:
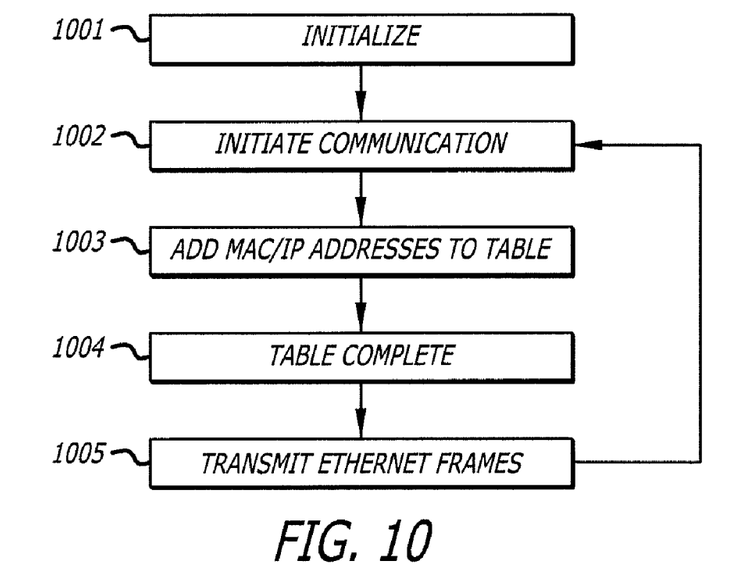
FIG. 10 is a flow diagram illustrating the transmission step of FIG. 9.

A description of one embodiment of the MAC/IP transmission of step 901 is illustrated in the flow diagram of FIG. 10. During a boot or initialization sequence 1001, any network-connected device inside the gaming machine will attempt to communicate with the network at step 1002 by sending its MAC/IP address via the SMIB or other switching device. The nature of this initial communication may be for a DHCP or BOOTP configuration, an ARP request, or any other attempt to identify itself to the back-end system. The MAC/IP addresses that are part of these communication attempts are added at step 1003 to a table. This table is managed by the SMIB 803 in one embodiment, or by the GMU 802 in another embodiment. Eventually at step 1004, a table will be generated that contains the MAC/IP addresses of all of the devices in the gaming machine.

In one embodiment, the devices send only their MAC addresses but the switch or other management device associates an IP address with each MAC address to populate a table. This embodiment may be used when IP addresses are assigned dynamically as described above.

At step 1005, the switch or GMU, or whichever device is managing the address table, periodically transmits raw Ethernet frames, USB packets, or TCP packets that include a list of the attached MAC/IP addresses associated with that game machine. In one embodiment, the frame is sent on a regular basis (e.g. every three to five seconds) so that other devices can expect that frame and react appropriately if it is not received. The transmitted frame is sent to switches and game machines on the network. In one embodiment, the transmission is via User Datagram Protocol (UDP) but any suitable protocol may be used without departing from the spirit and scope of the invention. In this manner, game machine devices need only be able to recognize the frame to take action. Eventually all of the MAC/IP addresses of game machine devices are published throughout the network. In this embodiment, there is no necessity of flooding the network with broadcasts frames with address information. This information is distributed organically throughout the network.

The process in one embodiment is an ongoing process, shown by the return path from step 1005 to step 1002 in FIG. 10. The tables are rebroadcast periodically by the switch. This rebroadcast allows devices to learn about other new devices that have been added to the network. It also allows device to know when another device has left the network.

At this point in the process the information being collected is pre-authentication. It allows a list of possible devices to be known and addressable so that if the device is valid and authenticated, it can participate on the network.

Identification

Figure 11:
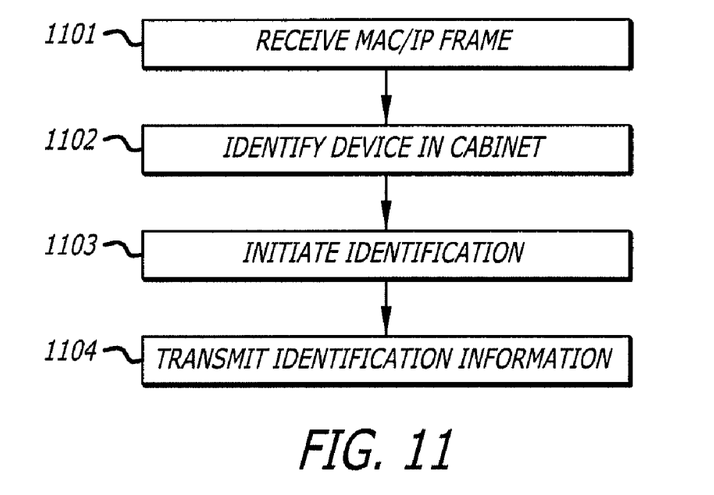
FIG. 11 is a flow diagram illustrating the identification step of FIG. 9.

The identification process 802 is described in conjunction with FIG. 11. A device receives a MAC/IP transmission frame from the switch at step 1101. This is an ongoing process during runtime as the switch periodically transmits Ethernet frames containing updated and new MAC/IP address information as described above. At step 1102 the device identifies other devices within the same game machine or cabinet from information in the Ethernet frame. At step 1103 the device initiates an identification communication with one or more other devices in the game machine. The form of this transmission at step 1104 may be as simple as sending an "I'm here" message. In other embodiments, the identification message may include identification information about the device at step 1104. This information may include information such as the port address, device ID, a preferred communication protocol, and the like. In other embodiments, such information is provided during communication negotiations.

Verification

Once two devices have identified themselves to each other, a verification procedure can take place. The verification procedure is intended to establish that the device with which another device is communicating is a valid gaming device. In one embodiment of the invention, verification may be accomplished by using the protocol described herein in connection with FIGS. 3 and 4. Any suitable verification protocol may be utilized without departing from the scope and spirit of the invention. In-cabinet devices have similar security concerns as other network devices described herein.

In one embodiment, a verification method such as is described in pending U.S. patent application Ser. No. 10/243,912, filed on Sep. 13, 2002, and entitled "Device Verification System and Method", assigned to the assignee of the invention, and incorporated by reference herein in its entirety. The invention provides a system and method for verifying a device by verifying the components of that device. The components may comprise, for example, software components, firmware components, hardware components, or structural components of an electronic device. These components include, without limitation, processors, persistent storage media, volatile storage media, random access memories, read-only memories (ROMs), erasable programmable ROMs, data files (which are any collections of data, including executable programs in binary or script form, and the information those programs operate upon), device cabinets (housings) or cathode ray tubes (CRTs). Identification numbers or strings of the components are read and then verified. The process of verifying may comprise matching each identification number in a database to determine whether each identification number is valid. In the case where a data file comprises one of a plurality of operating system files, verification of that file, in effect, comprises verifying part of an operating system. For data files, the file names may comprise the identification numbers.

The database may comprise a relational database, object database, or may be stored in XML format, or in a number of other formats that are commonly known. The database may also comprise an independent system stack of bindings, which comprise numbers, identification strings or signatures in the database for matching or authenticating the components, from manufacturers of the components, each identification number being verified using the binding from the manufacturer of the respective component to verify the component. Especially in the context of smaller devices such as personal digital assistants (PDAs), such a system stack may comprise a subset of one or more global component databases containing bindings from manufacturers of the components, each binding of the subset being associated with at least one of the identification numbers of one of the components in the device.

Structural components, such as cabinets, may contain an electronic identification chip embedded within them, such as a so-called Dallas chip or an IBUTTON device manufactured by Dallas Semiconductor of Dallas, Tex. These devices allow a unique identifier, placed within a semiconductor or chip, to be placed on a component that may or may not be electronic, such as a computer or gaming machine cabinet. The IBUTTON device is a computer chip enclosed in a 16 mm stainless steel can. The steel button can be mounted, preferably permanently or semi-permanently, on or in the structural component. Two wires may be affixed to the IBUTTON device, one on the top, and one on the bottom, to exchange data between the IBUTTON device and a processor, serial port, universal serial bus (USB) port, or parallel port.

The matching process may comprise matching each identification number based on the type of component that the identification number identifies. The identification number and the type of component are matched in the database in order to verify that the identification number is valid. Operation of the device may be stopped if any one of the identification numbers is not matched in the database. In the case of a game or gaming machine type of device, a tilt condition message is generated if any one of the identification numbers is not matched in the database.

The database may consist of a set of signatures, also called bindings. At least with respect to the components that comprise data files or firmware, a well-known hash function, the Secure Hash Function-1, also known as SHA-1, may be used to compute a 160-bit hash value from the data file or firmware contents. This 160-bit hash value, also called an abbreviated bit string, is then processed to create a signature of the game data using an equally well-known, one-way, private signature key technique, the Digital Signature Algorithm (DSA). The DSA uses a private key of a private key/public key pair, and randomly or pseudorandomly generated integers, to produce a 320-bit signature of the 160-bit hash value of the data file or firmware contents. This signature is stored in the database in addition to the identification number.

Either contained in the device, or in communication with the device, is a processor and a memory containing executable instructions or a software program file for verification of the components (verification software), which may itself be one of the components to verify. The verification software may be stored on a persistent storage media such as a hard disk device, read only memory (ROM), electrically erasable programmable read-only memory (EEPROM), in the aforementioned CMOS memory, battery-backed random access memory, flash memory or other type of persistent memory. Preferably, the verification software is stored in a basic input/output system (BIOS) on a solid-state persistent memory device or chip. BIOS chips have been used for storing verification software, such as the BIOS+ chip used by Bally Gaming Systems, Inc. of Las Vegas, Nev. in their EVO gaming system. Placing the verification software in the BIOS is advantages because the code in the BIOS is usually the first code executed upon boot or start-up of the device, making it hard to bypass the verification process.

Alternatively, the verification software may be stored in a firmware hub, which may comprise the part of an electronic device or computer that stores BIOS information. In personal computer hub technology, such as that manufactured by the Intel Corporation of Santa Clara, Calif., a hub is used in place of a peripheral component interconnect (PCI) bus to connect elements of chipsets.

The persistent storage media may be a removable storage unit such as a CD-ROM reader, a WORM device, a CD-RW device, a floppy disk device, a removable hard disk device, a ZIP disk device, a JAZZ disk device, a DVD device, a removable flash memory device, or a hard card device. However, the database is preferably stored in a non-removable, secure device either within the device being verified, or remotely on a server, in order to enhance security.

The verification software executes a DSA verification of the data files and firmware components. Also stored in the database is the public key of the private key/public key pair. For each data file and firmware component, as part of the DSA verification, the processor and verification software first computes the hash value of the digital contents of the component using the SHA-1 algorithm. The verification software then processes or authenticates this computed hash value, using the DSA signature verification algorithm, which also takes, as input, the aforementioned public key stored in the database. The verification part of the DSA produces a boolean result (yes or no) as to whether the inputs solve the algorithm. If the algorithm is not solved by the inputs, then an unexpected result is produced, thereby failing to verify the particular component. This may cause a fault tilt to occur to prohibit the loading operation of the device. Otherwise, use of the device is permitted. A detailed description of the DSA can be found in the U.S. government's Federal Information Processing Standards Publication (FIPS) 186-2. That publication describes each step of the DSA signature generation and verification.

Alternatively, the set of executable instructions may use the Rivest-Shamir-Adleman (RSA) algorithm to verify the components. Using the RSA algorithm, a first abbreviated bit string or hash value is computed from each component's digital contents and encrypted into a digital signature. The digital signature is stored in the database along with the identification number for the component. When the device is verified, the component is verified by computing a second abbreviated bit string computed from the component's digital contents. The signature is retrieved from the database by searching the database for the identification number. The signature is decrypted to recover the first abbreviated bit string. The component is then verified by comparing the second abbreviated bit string with the first abbreviated bit string. If the first and second abbreviated bit strings do not match, then the component is not verified. As discussed below, this may cause a fault tilt to occur to prohibit the loading operation of the device. Otherwise, use of the device is permitted.

Instead of creating a digital signature for, or signing, each data file individually, collections of data files may be signed together in order speed up processing. The abbreviated bit strings, hash values, or signatures, also called digests, of the collection of data files are collected into a catalog file, and the catalog is signed as described above.

Communication

Figure 12:
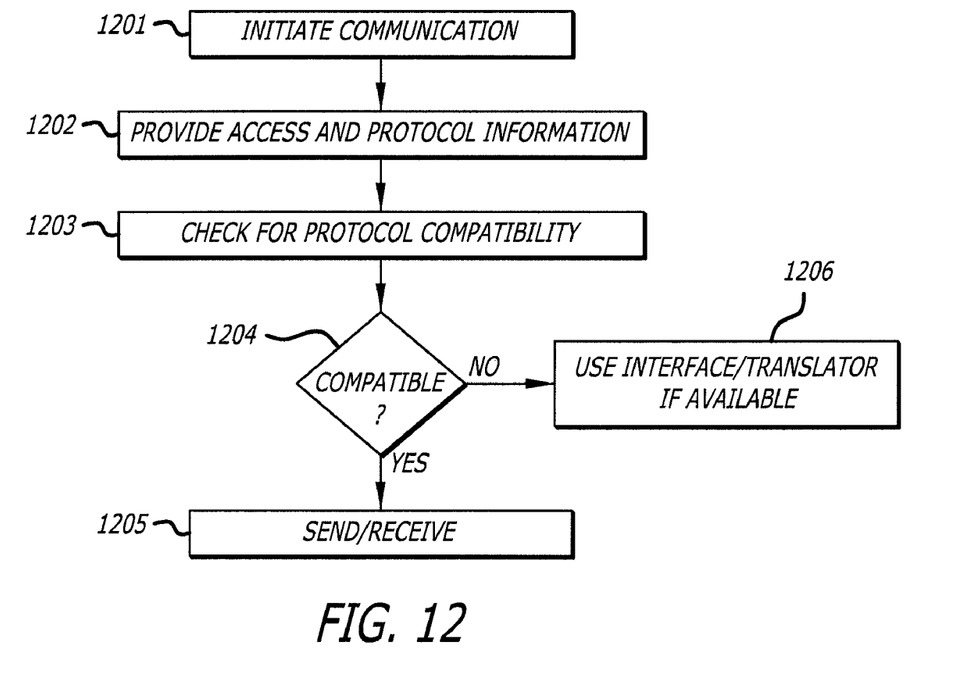
FIG. 12 is a flow diagram illustrating the communication step of FIG. 9.

After verification between devices has been completed, they may begin communication. At step 1201 of FIG. 12, a device initiates a communication with another device. The sending device may include a section of the first message to provide needed information to the intended recipient. This information may include at step 1202 the type of device, the protocol the device is using, any restrictions related to QOS, and other communication related information. At step 1203 the recipient determines if it can communicate with the sender directly or if an interface is needed at decision block 1204. If an interface is needed at step 1206, the sender and receiver may need to communicate through the GMU, for example, if the GMU includes software or firmware for translating appropriately for the devices. If the devices can communicate directly, then messages are sent back and forth using an accepted protocol at step 1205.

The invention allows devices to be aware of each other's presence through MAC/IP transmissions. This permits the use of a single network port for each device to uses to communicate with each other and with a back-end system. The devices do not need pre-knowledge of the MAC/IP addresses of other devices but can learn them at start up and during run-time. The system also allows a new device to be added to a game cabinet and have it be integrated and identified to the system without extensive IT effort.

Although the invention has been described in connection with in-cabinet devices identifying themselves to each other, it is not limited to such an application. The invention may be used to provide identification of any network devices by organically updating identification information periodically in Ethernet frames. In addition, the invention is not limited to the specific network configuration described herein. Rather, the system can work with any number of network configurations without departing from the scope and spirit of the invention.

It will be apparent from the foregoing that, while particular forms of the claimed invention have been illustrated and described, various modifications can be made without departing from the spirit and scope of the claimed invention. Accordingly, it is not intended that the claimed invention be limited, except as by the appended claims.

What is claimed is:

1. A method for identifying a first in-cabinet gaming device on a gaming network, the method comprising:
   providing a plurality of gaming devices connected to the network, wherein each gaming device includes a plurality of in-cabinet devices that communicate with each other;
   transmitting a MAC/IP address of the first in-cabinet gaming device within a first gaming machine during an initialization procedure;
   detecting the transmission at a switch and creating a table of the MAC/IP address of the first in-cabinet gaming device;
   periodically transmitting the table from the switch to the gaming network;
   receiving the MAC/IP address of a second in-cabinet gaming device within the first gaming machine at the first in-cabinet gaming device; and
   initiating a verification procedure between the first in-cabinet gaming device and the second in-cabinet gaming device to permit communication between the in-cabinet gaming devices;
   wherein the gaming network maps an association between an IP address, a device MAC address, and a unique device identifier (DID), and wherein the gaming network treats any alteration of the IP/MAC/DID association as an intrusion attempt;
   wherein the in-cabinet gaming devices are made aware of each other's presence through MAC/IP transmissions, and wherein the gaming method enables use of a single network port for each in-cabinet device to communicate with each other and with a back-end system;
   wherein the in-cabinet gaming devices do not require pre-knowledge of the MAC/IP addresses of other devices, since the in-cabinet gaming devices can learn the MAC/IP addresses of other devices both at start up and during run-time, thereby enabling new in-cabinet gaming devices to be added to a game cabinet where the new devices are integrated and identified.

2. The method of claim 1 wherein the switch transmits the table in an Ethernet frame.

3. The method of claim 1 wherein the verification procedure comprises Internet Key Exchange (IKE) protocol phase I.

4. The method of claim 1 wherein the verification procedure comprises Internet Key Exchange IKE protocol phase II.

5. The method of claim 1 wherein the verification procedure comprises reading an identification number of a component of the first gaming device and verifying that the identification number is valid.

6. The method of claim 1 wherein the switch is a Mastercom switch.

7. A method of identifying in-cabinet gaming devices on a gaming network, the method comprising:
   providing a plurality of gaming devices connected to the network, wherein each gaming device includes a plurality of in-cabinet devices that enable communication with each other;
   causing each gaming device to transmit its MAC address on the gaming network and collecting the MAC addresses for each in-cabinet gaming device in a table at a switch;
   periodically transmitting the table to the gaming devices;

initiating an identification process from a first in-cabinet gaming device to a second in-cabinet gaming device, wherein the first and second in-cabinet gaming devices are disposed in the same gaming machine, and wherein the identification process enables the in-cabinet devices to identify themselves to each other;

executing a verification process between the first and second in-cabinet gaming devices; and permitting communication between the first and second in-cabinet gaming devices if the verification process is successful, wherein the gaming network maps an association between an IP address, a device MAC address, and a unique device identifier (DID), and wherein the gaming network treats any alteration of the IP/MAC/DID association as an intrusion attempt;

wherein the in-cabinet gaming devices are made aware of each other's presence through MAC/IP transmissions, and wherein the gaming method enables use of a single network port for each in-cabinet device to communicate with each other and with a back-end system;

wherein the in-cabinet gaming devices do not require pre-knowledge of the MAC/IP addresses of other devices, since the in-cabinet gaming devices can learn the MAC/IP addresses of other devices both at start up and during run-time, thereby enabling new in-cabinet gaming devices to be added to a game cabinet where the new devices are integrated and identified.

8. The method of claim 7 wherein the transmission of the table is accomplished in an Ethernet frame.

9. The method of claim 7 wherein the verification procedure comprises Internet Key Exchange (IKE) protocol phase I.

10. The method of claim 7 wherein the verification procedure comprises Internet Key Exchange IKE protocol phase II.

11. The method of claim 7 wherein the verification procedure comprises reading an identification number of a component of the first gaming device and verifying that the identification number is valid.

12. The method of claim 7 wherein the switch is a Master-com switch.

13. The method of claim 7 wherein the table is rebroadcast over the gaming network.

14. A method of identifying a first and second in-cabinet gaming device on a gaming network, the method comprising:

providing a plurality of gaming devices connected to the network, wherein each gaming device includes a plurality of in-cabinet devices configured to communicate with each other;

causing the first in-cabinet gaming device to send identifying information on the gaming network;

causing the second in-cabinet gaming device to send identifying information on the gaming network to the first in-cabinet gaming device, wherein the first and second in-cabinet gaming devices are located in the same gaming machine, and wherein the sending of the identifying information enables the in-cabinet devices to identify themselves to each other; and collecting the identifying information in a table at a switch in the gaming network, wherein the gaming network maps an association between an IP address, a device MAC address, and a unique device identifier (DID), and wherein the gaming network treats any alteration of the IP/MAC/DID association as an intrusion attempt;

wherein the in-cabinet gaming devices are made aware of each other's presence through MAC/IP transmissions, and wherein the gaming method enables use of a single network port for each in-cabinet device to communicate with each other and with a back-end system;

wherein the in-cabinet gaming devices do not require pre-knowledge of the MAC/IP addresses of other devices, since the in-cabinet gaming devices can learn the MAC/IP addresses of other devices both at start up and during run-time, thereby enabling new in-cabinet gaming devices to be added to a game cabinet where the new devices are integrated and identified.

15. The method of claim 14 further including transmitting the table periodically on the network.

16. The method of claim 15 wherein the identifying information is used to generate address information.

17. The method of claim 16 wherein the identifying information is a MAC address.

18. The method of claim 17 wherein the MAC address is associated with an IP address in the table.

19. The method of claim 14 further comprising: verifying the first gaming device and the second gaming device.

20. The method of claim 19 further comprising: permitting communication between the first gaming device and the second gaming device when the verifying is successful.

* * * * *